(12) United States Patent
Cheng et al.

(10) Patent No.: US 8,879,229 B2
(45) Date of Patent: Nov. 4, 2014

(54) DISPLAY PANEL DRIVER CIRCUIT AND OVERHEAT PROTECTION DEVICE THEREOF

(71) Applicant: ILI Technology Corporation, Jhubei (TW)

(72) Inventors: Chih-Kang Cheng, Hsinchu (TW); Feng-Hsiang Huang, Kaohsiung (TW)

(73) Assignee: ILI Technology Corporation, Hsinchu County (TW)

( * ) Notice: Subject to any disclaimer, the term of this patent is extended or adjusted under 35 U.S.C. 154(b) by 115 days.

(21) Appl. No.: 13/794,598

(22) Filed: Mar. 11, 2013

(65) Prior Publication Data
US 2014/0092499 A1    Apr. 3, 2014

(30) Foreign Application Priority Data
Oct. 1, 2012    (TW) .............................. 101136226 A

(51) Int. Cl.
*H02H 3/08* (2006.01)
*H02H 6/00* (2006.01)
(52) U.S. Cl.
CPC ..................................... *H02H 6/00* (2013.01)
USPC ............ 361/103; 361/106; 345/101; 345/102

(58) Field of Classification Search
USPC ........................... 361/103, 106; 345/101, 102
See application file for complete search history.

(56) References Cited

U.S. PATENT DOCUMENTS

| | | | |
|---|---|---|---|
| 8,269,716 B2 * | 9/2012 | Shen | 345/102 |
| 2007/0035707 A1 * | 2/2007 | Margulis | 353/122 |
| 2007/0229443 A1 * | 10/2007 | Sawada et al. | 345/101 |
| 2008/0238860 A1 * | 10/2008 | Onodera | 345/102 |
| 2011/0069050 A1 * | 3/2011 | Sirmon et al. | 345/207 |
| 2012/0255721 A1 * | 10/2012 | Kim et al. | 165/288 |

* cited by examiner

*Primary Examiner* — Zeev V Kitov
(74) *Attorney, Agent, or Firm* — Christie, Parker & Hale, LLP

(57) ABSTRACT

A display panel driver circuit includes multiple drivers adapted for cooperatively driving a display panel and each operable under a protection mode, and an overheat protection device including multiple protection circuits, each of which controls a respective one of the drivers to operate under the protection mode in response to receipt of an enable signal, an interface circuit which transmits the enable signal to each of the protection circuits in response to receipt of a warning signal, and multiple temperature detection circuits, each of which is able to detect a temperature associated with a respective one of the drivers, and outputs the warning signal to the interface circuit based on the temperature thus detected.

10 Claims, 1 Drawing Sheet

DISPLAY PANEL DRIVER CIRCUIT AND OVERHEAT PROTECTION DEVICE THEREOF

CROSS-REFERENCE TO RELATED APPLICATION

This application claims priority of Taiwanese Patent Application No. 101136226, filed on Oct. 1, 2012.

BACKGROUND OF THE INVENTION

1. Field of the Invention

This invention relates to a circuit, more particularly to a display panel driver circuit and an overheat protection device thereof.

2. Description of the Related Art

A conventional display panel for displaying frames is controlled by a plurality of source and gate drivers which may over-heated under certain circumstances and are in need of overheat protection.

SUMMARY OF THE INVENTION

Therefore, an object of the present invention is to provide a display panel driver circuit that is capable of providing overheat protection.

Accordingly, a display panel driver circuit of this invention comprises a plurality of drivers and an overheat protection device.

The drivers are adapted for cooperatively driving a display panel. Each of the drivers is operable under a protection mode so as to protect the display panel from damaging due to overheat. The overheat protection device includes a plurality of protection circuits, an interface circuit, and a plurality of temperature detection circuits.

Each of the protection circuits is electrically connected to a respective one of the drivers, and controls the respective one of the drivers to operate under the protection mode in response to receipt of an enable signal.

The interface circuit is electrically connected to each of the protection circuits, and transmits the enable signal to each of the protection circuits in response to receipt of a warning signal.

Each of the temperature detection circuits is electrically connected to the interface circuit, is able to detect a temperature associated with a respective one of the drivers, and is able to output the warning signal to the interface circuit based on the temperature thus detected.

Another object of the present invention is to provide an overheat protection device.

Accordingly, an overheat protection device is adapted to control a plurality of drivers which cooperatively drive a display panel and each of which is operable under a protection mode. The overheat protection device of this invention comprises a plurality of protection circuits, an interface circuit, and a plurality of temperature detection circuits.

Each of the protection circuits is adapted to be electrically connected to a respective one of the drivers, and controls the respective one of the drivers to operate under the protection mode in response to receipt of an enable signal.

The interface circuit is electrically connected to each of the protection circuits, and transmits the enable signal to each of the protection circuits in response to receipt of a warning signal.

Each of the temperature detection circuits is electrically connected to the interface circuit, is able to detect a temperature associated with a respective one of the drivers, and is able to output the warning signal to the interface circuit based on the temperature thus detected.

BRIEF DESCRIPTION OF THE DRAWING

Other features and advantages of the present invention will become apparent in the following detailed description of the preferred embodiment of the invention, with reference to the accompanying drawing, in which.

DETAILED DESCRIPTION OF THE PREFERRED EMBODIMENT

Figure 1:
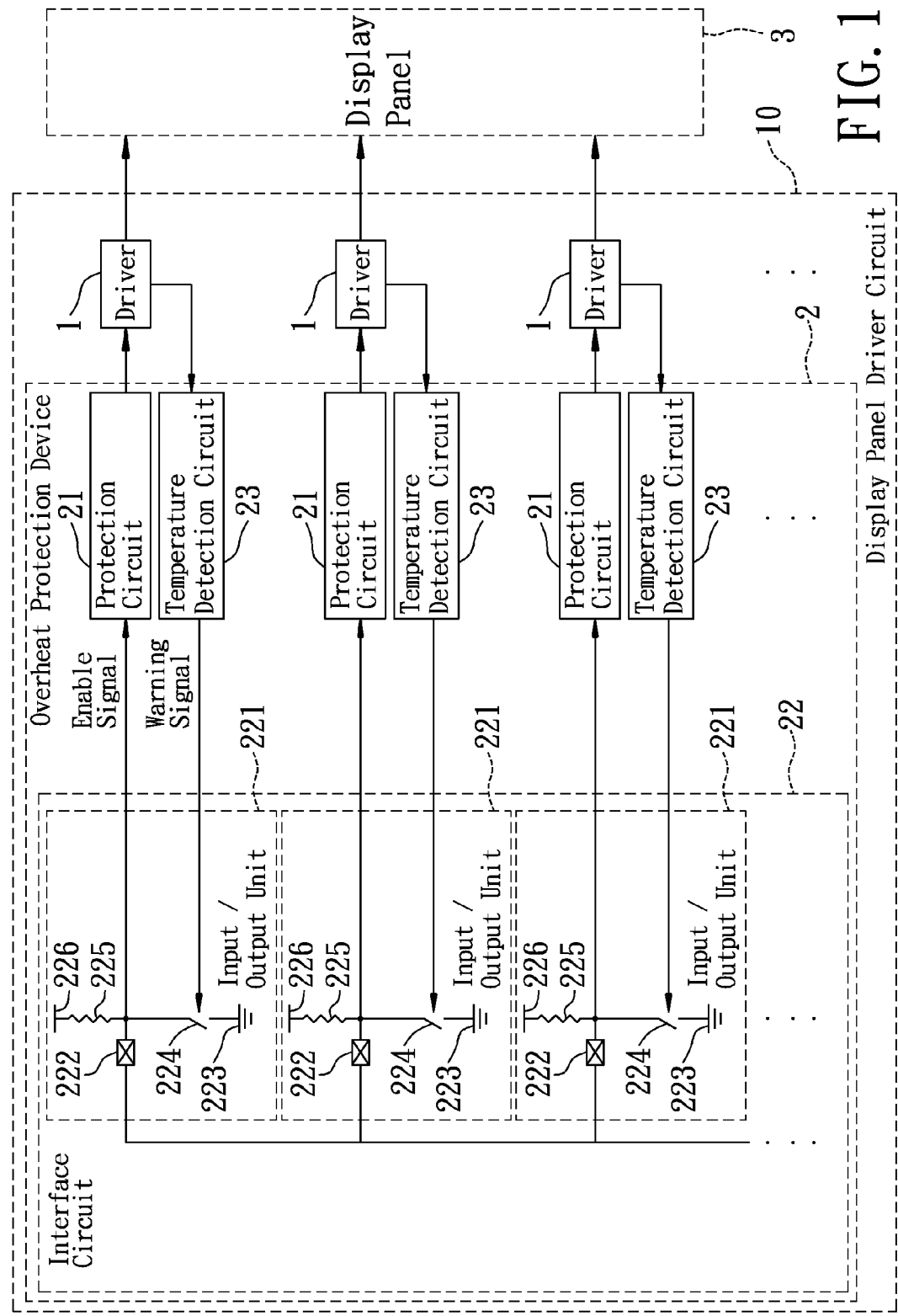
FIG. 1 is a block diagram of a display panel driver circuit according to the preferred embodiment of this invention.

As shown in FIG. 1, a display panel driver circuit 10 according to the preferred embodiment of this invention includes a plurality of drivers 1 and an overheat protection device 2.

The drivers 1 are adapted for cooperatively driving a display panel 3. Each of the drivers 1 is operable under a protection mode so as to protect the display panel 3 from damaging due to overheat.

The overheat protection device 2 includes a plurality of protection circuits 21, an interface circuit 22, and a plurality of temperature detection circuits 23.

Each of the protection circuits 21 is electrically connected to a respective one of the drivers 1, and controls the same to operate under the protection mode in response to receipt of an enable signal.

The interface circuit 22 is electrically connected to each of the protection circuits 21, and transmits the enable signal to each of the protection circuits 21 in response to receipt of a warning signal.

Each of temperature detection circuits 23 is electrically connected to the interface circuit 22, is able to detect a temperature associated with a respective one of the drivers 1, and is able to output the warning signal to the interface circuit 22 based on the temperature thus detected. Specifically, each of the temperature detection circuits 23 outputs the warning signal upon determining that the temperature detected is thereby greater than a predetermined threshold, such as 160° C. or 170° C. In other words, the interface circuit 22 would receive the warning signal whenever the temperature detected by one of the temperature detection circuits 23 exceeds the predetermined threshold.

In the shown embodiment, the interface circuit 22 includes a plurality of input/output units 221 which are electrically connected to one another and are each further electrically connected to a respective one of the protection circuits 21 and a respective one of the temperature detection circuits 23. Each of the input/output units 221 outputs the enable signal in response to receipt of the warning signal by one of the input/output units 221. In other words, upon the warning signal being received by one of the input/output units 221, all of the input/output units 221 would output the enable signals to the respective protection circuits 21 so that the protection circuits 21 could control the respective drivers 1 to operate under the protection mode, to thereby protect the display panel 3 from damaging due to overheat.

Specifically, upon receiving the enable signals, the protection circuits 21 respectively control the drivers 1 to cooperatively output to the display panel 3 a black frame instead of a normal frame so that the drivers 1 operate under the protection mode. In this case, each of the protection circuits 21 may be a black insertion display function logic, and the protection mode is a low performance mode, as opposed to a normal, high performance mode. Alternatively, the drivers 1 may be controlled to lower electric current transmitted to the display panel 3 or may be controlled to cease performing certain functions when operating under the protection mode.

In this embodiment, each of the input/output units 221 includes an input/output terminal 222, a first voltage terminal 223, and a switch 224. The input/output terminal 222 is electrically connected to the input/output terminals 222 of other ones of the input/output units 221. The first voltage terminal 223 is adapted to be electrically connected to a first voltage source (ground in this embodiment). The switch 224 has a first terminal which is electrically connected to the first voltage terminal 223, a second terminal which is electrically connected to the input/output terminal 222, and a control terminal which is electrically connected to the respective one of the temperature detection circuits 23, and which connects the first and second terminals together upon receipt of the warning signal.

Each of the input/output units 221 further includes a bias resistor 225 and a second voltage terminal 226 which is adapted to be electrically connected to a second voltage source (a high voltage source in this embodiment). The bias resistor 225 is electrically connected between the input/output terminal 222 and the second voltage terminal 226.

When no warning signal is received by the switch 224, the first and second terminals of the switch 224 are disconnected from each other, such that the input/output terminal 222 remains at a high voltage potential. On the other hand, when the warning signal is received by the switch 224, the first and second terminals of the switch 224 are interconnected as controlled by the control terminal, such that the input/output terminal 222 is grounded, with the grounded voltage potential serving as the enable signal. Since the input/output terminals 222 of all of the input/output units 221 are interconnected, with one of the input/output terminals 222 being grounded, all of the other input/output terminals 222 are also grounded, such that in effect, each of the input/output units 221 transmits the enable signal to the respective one of the protection circuits 21.

The effect of this invention resides in that upon receiving the enable signals, the protection circuits 21 respectively control the drivers 1 to operate under the protection mode, such as by cooperatively outputting to the display panel 3 a black frame instead of a normal frame, to thereby protect the display panel 3 from damaging due to overheat.

With the interface circuit 22 configured in the manner as discussed above, whenever one of the temperature detection circuits 23 detects an excessive temperature and outputs the warning signal to the interface circuit 22 in response, the interface circuit 22 outputs the enable signal to each of the protection circuits 21. As a result, all of the drivers 1 are controlled to be under the protection mode where overheat is avoided, while maintaining the integrity of the black and normal frames displayed by the display panel 3.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A display panel driver circuit, comprising:
   a plurality of drivers, which are adapted for cooperatively driving a display panel, and each of which is operable under a protection mode so as to protect the display panel from damaging due to overheat; and
   an overheat protection device which includes:
      a plurality of protection circuits, each of which is electrically connected to a respective one of said drivers and controls the respective one of said drivers to operate under the protection mode in response to receipt of an enable signal;
      an interface circuit which is electrically connected to each of said protection circuits and transmits the enable signal to each of said protection circuits in response to receipt of a warning signal; and
      a plurality of temperature detection circuits, each of which is electrically connected to said interface circuit, is able to detect a temperature associated with a respective one of said drivers, and is able to output the warning signal to said interface circuit based on the temperature thus detected.

2. The display panel driver circuit of claim 1, wherein each of said temperature detection circuits outputs the warning signal upon determining that the temperature detected is thereby greater than a predetermined threshold.

3. The display panel driver circuit of claim 2, wherein said interface circuit includes a plurality of input/output units which are electrically connected to one another and are each further electrically connected to a respective one of said protection circuits and a respective one of said temperature detection circuits, each of said input/output units outputting the enable signal in response to receipt of the warning signal by one of said input/output units.

4. The display panel driver circuit of claim 3, wherein each of said input/output units includes:
   an input/output terminal which is electrically connected to said input/output terminals of all other ones of said input/output units;
   a voltage terminal which is adapted to be electrically connected to a voltage source; and
   a switch which has a first terminal electrically connected to said voltage terminal, a second terminal electrically connected to said input/output terminal, and a control terminal electrically connected to the respective one of said temperature detection circuits, and connecting said first and second terminals to each other upon receipt of the warning signal.

5. The display panel driver circuit of claim 1, wherein said drivers cooperatively output to the display panel a black frame instead of a normal frame when operating under the protection mode.

6. An overheat protection device adapted to control a plurality of drivers which cooperatively drive a display panel and each of which is operable under a protection mode, said overheat protection device comprising:
   a plurality of protection circuits, each of which is electrically connected to a respective one of the drivers and controls the respective one of the drivers to operate under the protection mode in response to receipt of an enable signal;
   an interface circuit which is electrically connected to each of said protection circuits and transmits the enable signal to each of said protection circuits in response to receipt of a warning signal; and
   a plurality of temperature detection circuits, each of which is electrically connected to said interface circuit, is able to detect a temperature associated with a respective one of the drivers, and is able to output the warning signal to said interface circuit based on the temperature thus detected.

7. The overheat protection device of claim 6, wherein each of said temperature detection circuit outputs the warning signal upon determining that the temperature detected thereby is greater than a predetermined threshold.

8. The overheat protection device of claim 6, wherein said interface circuit includes a plurality of input/output units which are electrically connected to one another and are each further electrically to a respective one of said protection circuits and a respective one of said temperature detection circuits, each of said input/output units outputting the enable signal in response to receipt of the warning signal by one of said input/output units.

9. The overheat protection device of claim 8, wherein each of said input/output units includes:
- an input/output terminal which is electrically connected to said input/output terminals of all other ones of said input/output units;
- a voltage terminal which is adapted to be electrically connected to a voltage source; and
- a switch which has a first terminal electrically connected to said voltage terminal, a second terminal electrically connected to said input/output terminal, and a control terminal electrically connected to the respective one of said temperature detection circuits, and connecting said first and second terminals to each other upon receipt of the warning signal.

10. The overheat protection device of claim 6, wherein in response to receipt of the enable signal, said protection circuits respectively control the drivers to cooperatively output to the display panel a black frame instead of a normal frame so that the drivers operate under the protection mode.

\* \* \* \* \*